(12) United States Patent
Celik et al.

(10) Patent No.: US 11,318,791 B2
(45) Date of Patent: May 3, 2022

(54) WHEEL FOR A SUPPORT STRUCTURE

(71) Applicant: The Goodyear Tire & Rubber Company, Akron, OH (US)

(72) Inventors: Ceyhan Celik, Stow, OH (US); Steven Amos Edwards, Akron, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 312 days.

(21) Appl. No.: 16/685,092

(22) Filed: Nov. 15, 2019

(65) Prior Publication Data

US 2021/0146721 A1    May 20, 2021

(51) Int. Cl.
*B60C 7/26* (2006.01)
*B60B 21/10* (2006.01)
*B60B 1/14* (2006.01)

(52) U.S. Cl.
CPC .............. *B60C 7/26* (2013.01); *B60B 21/106* (2013.01); *B60B 1/14* (2013.01)

(58) Field of Classification Search
CPC ....... B60B 21/106; B60B 1/14; B60B 27/065; B60B 25/04; B60B 9/00; B60B 3/02; B60B 21/10; B60C 7/102; B60C 7/146; B60C 7/14; B60C 7/24; B60C 7/26
See application file for complete search history.

(56) References Cited

U.S. PATENT DOCUMENTS

| | | |
|---|---|---|
| 479,255 A | 7/1892 | Dunlop |
| 482,175 A | 9/1892 | Hollafolla |
| 823,384 A | 6/1906 | Bardet |
| 1,002,003 A | 8/1911 | Simonson et al. |
| 1,233,722 A | 7/1917 | Smith |
| 1,389,285 A | 8/1921 | Althoff |
| 1,451,517 A | 4/1923 | Smith |
| 1,930,764 A | 10/1933 | Mallory |
| 3,493,027 A | 2/1970 | Dewhirst et al. |
| 4,226,273 A | 10/1980 | Long et al. |
| 4,235,270 A | 11/1980 | Kahaner et al. |
| 4,602,823 A | 7/1986 | Berg |
| 4,798,418 A | 1/1989 | Kempf et al. |
| 5,343,916 A | 9/1994 | Duddey et al. |
| 5,800,643 A | 9/1998 | Frankowski |

(Continued)

FOREIGN PATENT DOCUMENTS

| | | |
|---|---|---|
| EP | 3321100 A1 | 5/2018 |
| WO | 2017117598 | 7/2017 |

OTHER PUBLICATIONS

European Search Report for Serial No. EP 20206793 dated Mar. 3, 2021.

*Primary Examiner* — Kip T Kotter
(74) *Attorney, Agent, or Firm* — Robert N. Lipcsik; June E. Rickey

(57) ABSTRACT

A wheel assembly includes a mounting plate for attachment to a rotatable axle, a plurality of elongate friction members for engaging a tire assembly, a plurality of first angular flanges extending radially outward and circumferentially in a first direction from the mounting plate, and a plurality of second angular flanges extending radially outward and circumferentially in a second direction, opposite the first direction, from the mounting plate. Each elongate friction member is disposed axially between one of the first angular flanges and one of the second angular flanges.

18 Claims, 5 Drawing Sheets

(56) References Cited

U.S. PATENT DOCUMENTS

| | | | |
|---|---|---|---|
| 6,068,721 | A | 5/2000 | Dyer et al. |
| 6,260,598 | B1 | 7/2001 | Tanaka |
| 6,286,572 | B1 | 9/2001 | Chen |
| 7,032,634 | B2 | 4/2006 | Laurent et al. |
| 8,962,120 | B2 | 2/2015 | Delfino et al. |
| 8,978,726 | B2 | 3/2015 | Hutchinson |
| 9,387,726 | B2 | 7/2016 | Choi et al. |
| 10,040,317 | B2 | 8/2018 | Celik |
| 10,150,334 | B2 | 12/2018 | Celik |
| 10,207,544 | B2 | 2/2019 | Celik |
| 10,286,725 | B2 | 5/2019 | Celik et al. |
| 10,406,852 | B2 | 9/2019 | Celik et al. |
| 10,421,319 | B2 | 9/2019 | Gaylo et al. |
| 10,449,805 | B2 | 10/2019 | Shoji |
| 2003/0201043 | A1 | 10/2003 | Adams et al. |
| 2004/0069385 | A1 | 4/2004 | Timoney et al. |
| 2006/0144488 | A1 | 7/2006 | Vannan |
| 2010/0193097 | A1 | 8/2010 | McNier et al. |
| 2012/0205017 | A1 | 8/2012 | Endicott |
| 2014/0083581 | A1 | 3/2014 | Schaedler et al. |
| 2015/0048186 | A1* | 2/2015 | Pfrenger .................. B60C 7/00 239/726 |
| 2016/0214435 | A1 | 7/2016 | Schaedler et al. |
| 2017/0087930 | A1 | 3/2017 | Mcmaster et al. |
| 2017/0087931 | A1 | 3/2017 | Gaylo et al. |
| 2018/0001704 | A1 | 1/2018 | Reinhardt |
| 2018/0134072 | A1 | 5/2018 | Celik et al. |
| 2019/0126673 | A1 | 5/2019 | Celik et al. |
| 2019/0176516 | A1 | 6/2019 | Celik et al. |
| 2019/0299709 | A1* | 10/2019 | Celik ....................... B60B 3/10 |
| 2020/0047555 | A1 | 2/2020 | Costlow et al. |

\* cited by examiner

WHEEL FOR A SUPPORT STRUCTURE

FIELD OF INVENTION

The present invention relates to wheel/tire assemblies, and more particularly, to a wheel assembly for a vehicle.

BACKGROUND OF THE INVENTION

Radial pneumatic tires rely on the ply reinforcement to carry and transfer the load between the rim and the belt layer. These ply cords need to be tensioned to carry the load. Tensioning of these ply cords is achieved with the pressurized air in the inner chamber of the tire. If air pressure is lost, load carrying capacity of a pneumatic tire decreases significantly. Preventing the slow or sudden air pressure loss has been a challenge for the tire makers. One proposed solution is to use non-pneumatic tires. A top loader non-pneumatic tire can perform similar to a pneumatic tire if its durability, speed rating/limit and load capacity can be increased to the levels of a pneumatic tire.

Many top loader non-pneumatic tires rely on the polymeric spokes to carry the load of the vehicle. Spokes transfer the load from the rim to the shear band. Due to the characteristics of the polymeric materials used in the spokes of these tires, performance of these tires are limited. It is an object of the present invention to overcome this limitation and increase the load carrying capacity and durability of these spokes and hence the performance of the top loader non-pneumatic tire.

SUMMARY OF THE INVENTION

A wheel assembly in accordance with the present invention includes a mounting plate for attachment to a rotatable axle, a plurality of elongate friction members for engaging a tire assembly, a plurality of first angular flanges extending radially outward and circumferentially in a first direction from the mounting plate, and a plurality of second angular flanges extending radially outward and circumferentially in a second direction, opposite the first direction, from the mounting plate. Each elongate friction member is disposed axially between one of the first angular flanges and one of the second angular flanges.

According to another aspect of the wheel assembly, each friction member has an oval cross-sectional configuration in an axial direction.

According to still another aspect of the wheel assembly, the first flanges extend at a first angle from the mounting plate, the second flanges extend at a second angle from the mounting plate, and the second angle is equal and opposite to the first angle.

According to yet another aspect of the wheel assembly, each of the first angular flanges has a first stop plate for limiting axial movement between the wheel assembly and the tire assembly.

According to still another aspect of the wheel assembly, each friction member is secured to the mounting plate by the first stop plate.

According to yet another aspect of the wheel assembly, each of the second angular flanges has a second stop plate for limiting axial movement between the wheel assembly and the tire assembly.

According to still another aspect of the wheel assembly, each friction member is secured to the mounting plate by the second stop plate.

According to yet another aspect of the wheel assembly, the first stop plate is disposed at a first axial end of one of the friction members and the second stop plate is disposed at a second, opposite axial end of the one friction member.

According to still another aspect of the wheel assembly, each friction member coordinates with two axially extending cylindrical rods of the mounting plate for securing the tire assembly to the wheel assembly.

According to yet another aspect of the wheel assembly, the second angular flanges are secured to the friction members by bolts.

A method in accordance with the present invention secures a wheel assembly to a tire assembly. The method includes the steps of: attaching a mounting plate to a rotatable axle; extending a plurality of elongate friction members axially from the mounting plate; engaging the tire assembly with the plurality of elongate friction members; extending a plurality of first angular flanges radially outward and circumferentially in a first direction from the mounting plate; extending a plurality of second angular flanges radially outward and circumferentially in a second direction, opposite the first direction, from the mounting plate; and positioning each elongate friction member axially between one of the first angular flanges and one of the second angular flanges.

According to another aspect of the method, each friction member has an oval cross-sectional configuration in an axial direction.

According to still another aspect of the method, other steps include extending the first flanges at a first angle from the mounting plate and extending the second flanges at a second angle from the mounting plate, the first angle being equal and opposite the second angle.

According to still another aspect of the method, another step includes limiting axial movement between the wheel assembly and the tire assembly with first stop plates extending from the first angular flanges.

According to yet another aspect of the method, another step includes securing each friction member to the mounting plate by the first stop plate.

According to still another aspect of the method, another step includes limiting axial movement between the wheel assembly and the tire assembly with second stop plates extending from the second angular flanges.

According to yet another aspect of the method, another step includes securing each friction member to the mounting plate by the second stop plate.

According to still yet another aspect of the method, other steps include positioning the first stop plate at a first axial end of one of the friction members and positioning the second stop plate at a second, opposite axial end of the one friction member.

According to yet another aspect of the method, another step includes coordinating each friction member with two axially extending cylindrical rods of the mounting plate for securing the tire assembly to the wheel assembly.

According to yet another aspect of the method, another step includes securing the second angular flanges to the friction members with bolts.

BRIEF DESCRIPTION OF THE DRAWINGS

The present invention will be more clearly understood by the following description of some examples thereof, with reference to the accompanying drawings, in which.

DESCRIPTION OF EXAMPLES OF THE PRESENT INVENTION

A conventional wheel/tire assembly, such as that described in U.S. Pat. Nos. 10,040,317, 10,207,544, and 10,286,725, all three incorporated herein by reference in their entirety, may have an outer ring, such as a shear band, flexibly connected to a central hub by means of lightweight composite springs. The springs may be plates fixed to the ring and to the hub. The hub may contain a speed reduction gear unit and/or an electric motor and may have a suspension mechanism for connecting a vehicle chassis to each wheel. The ring may be constructed from a flexible composite material, such as carbon fiber reinforced nylon material and have twin rubber tires and a plurality of circumferentially spaced-apart radial cleats which engage the ground and provide improved traction. The hub may also be formed from a carbon fiber reinforced composite material. Another conventional wheel may have a rubber strip with a molded tread bonded to a composite ring for improved grip. Further, the springs interconnecting the ring and hub may be S-shaped lightweight composite springs.

Another conventional wheel/tire assembly may be formed from a lightweight composite material, such as carbon fiber reinforced polyamide. The assembly may have a cylindrical central hub and a circular outer flexible rim mounted on the central hub by an endless looped spring band extending between the central hub and the circular rim. Six radial loops may be defined by the spring band. The spring band may be attached to the central hub and to the circular rim by any suitable means, such as adhesion, cohesion, soldering and/or mechanical fixing by means of bolts, rivets, and/or clamps.

Figure 5:
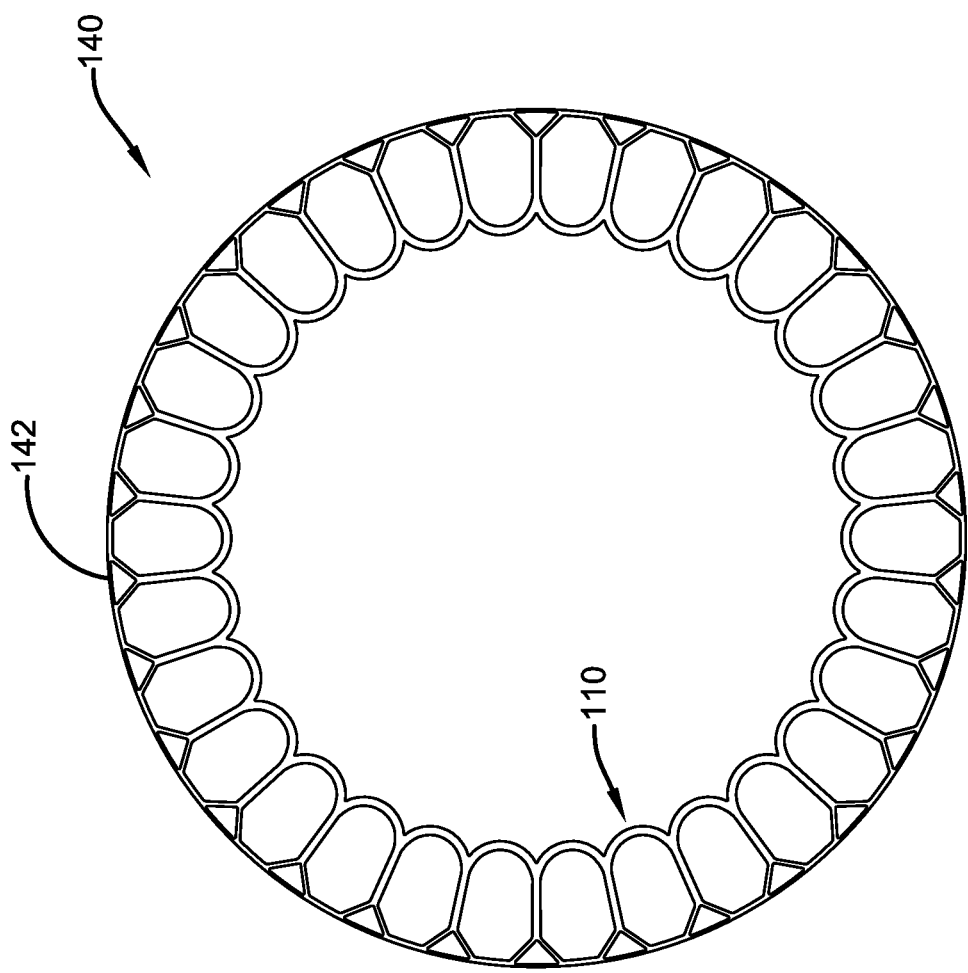
FIG. 5 is a schematic side view of an example tire assembly for use with the wheel assembly of FIG. 1.

As shown in FIG. 5, another example tire assembly 140, for use with the present invention, may be formed from a lightweight polymer material, such as, for example, a standard tire rubber compound, a thermoplastic polymer, polyethylene terephthalate (PET), polyether ether ketone (PEEK), a cross-linking polymer like natural rubber, synthetic rubber-like polymers, epoxy resins, and/or phenolic resins. The assembly 140 may be used with an inner central rim, such as an automobile wheel (not shown), and a circular outer flexible ring 142, which may include a shear band and tread structure, mounted on the inner central rim by a continuous cord/fabric reinforced spoke structure 110 extending between the inner central rim and the outer ring.

The spoke structure 110 may define a plurality of cavities disposed concentrically about the inner central rim allowing the spoke structure to deflect under load thereby defining a suitable balance between flexibility for ride comfort and traction within a footprint of the assembly 140 and stiffness for vehicle handling, low rolling resistance, and low heat build-up within the spoke structure 110.

The spoke structure 110 may include one or more reinforcing layers. The layer(s) may be constructed of single end dipped cords, conventional pneumatic tire ply/cord arrangements, short fibers, and/or polymeric film. Further, these constructions may be PET, nylon 6, nylon 6,6, rayon, steel, glass fibers, carbon fiber, aramid, and/or a hybrid construction of these materials. The cords may be from 400 denier to 9000 denier. The polymeric film may be from 0.1 mm to 2.0 mm thick. The spokes spoke structure 110 may also include a plurality of elements disposed side-by-side such that the elements extend circumferentially around the perimeter of the inner central rim and radially inside the outer flexible ring 142.

Figure 1:
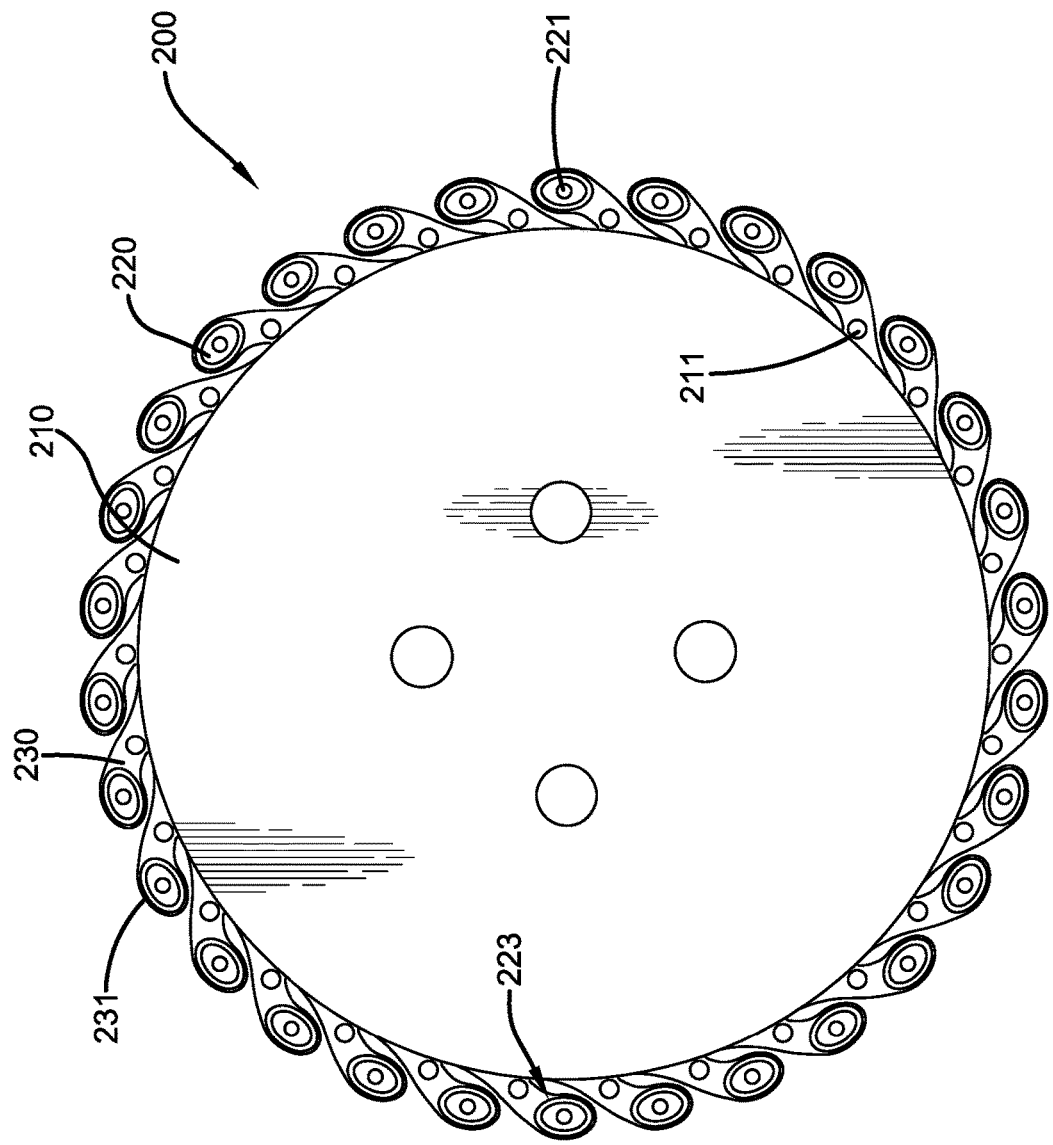
FIG. 1 is a schematic side view of an example wheel assembly in accordance with the present invention.
Figure 2:
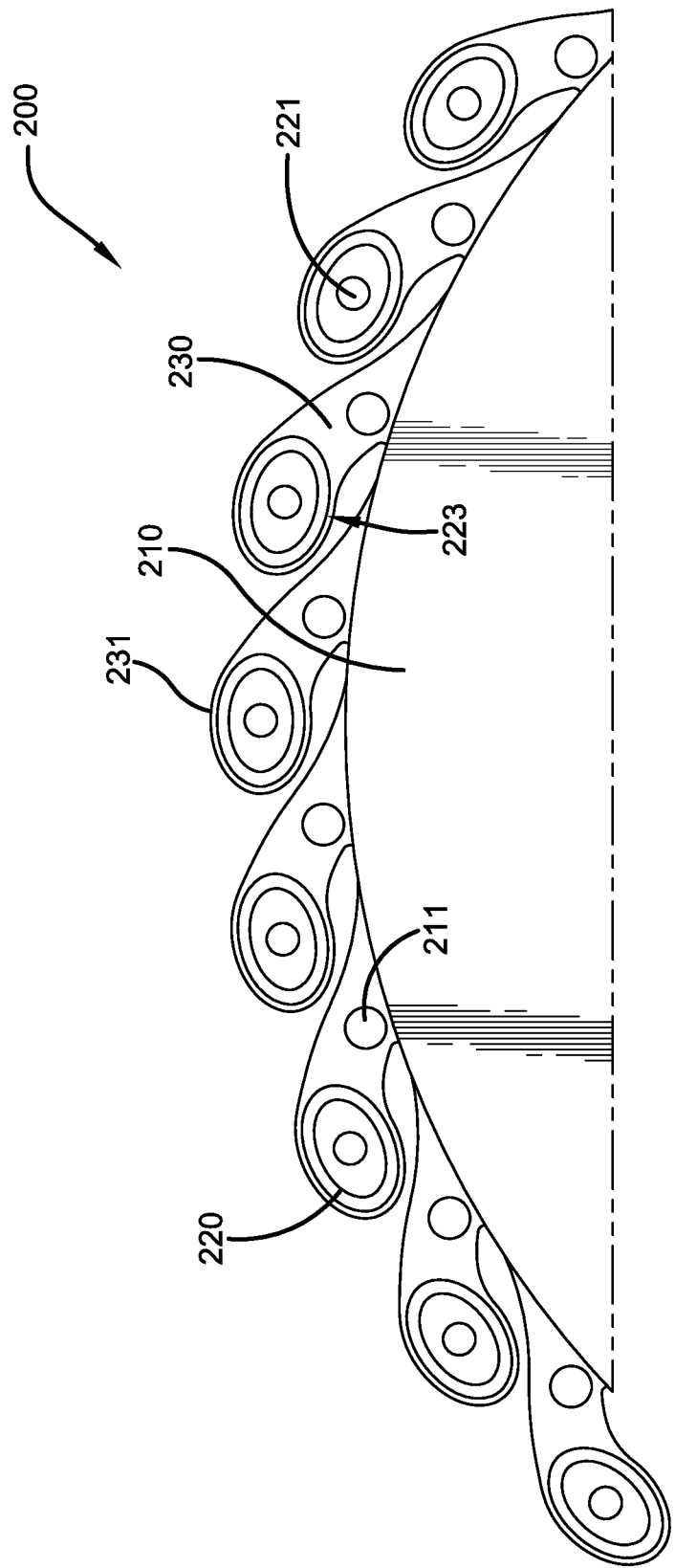
FIG. 2 is a schematic detailed side view of the wheel assembly of FIG. 1.
Figure 3:
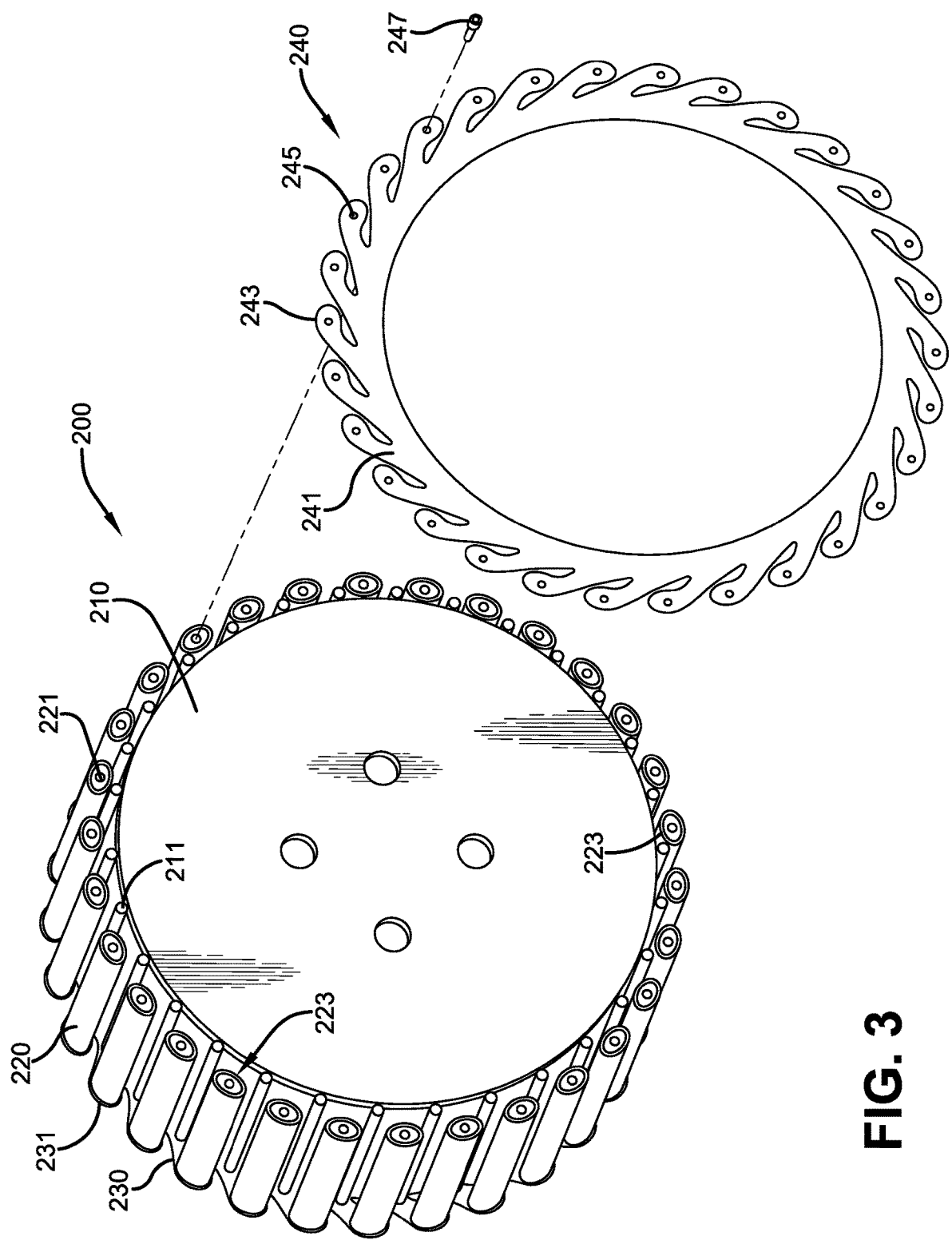
FIG. 3 is a schematic perspective view of the wheel assembly of FIG. 1.
Figure 4:
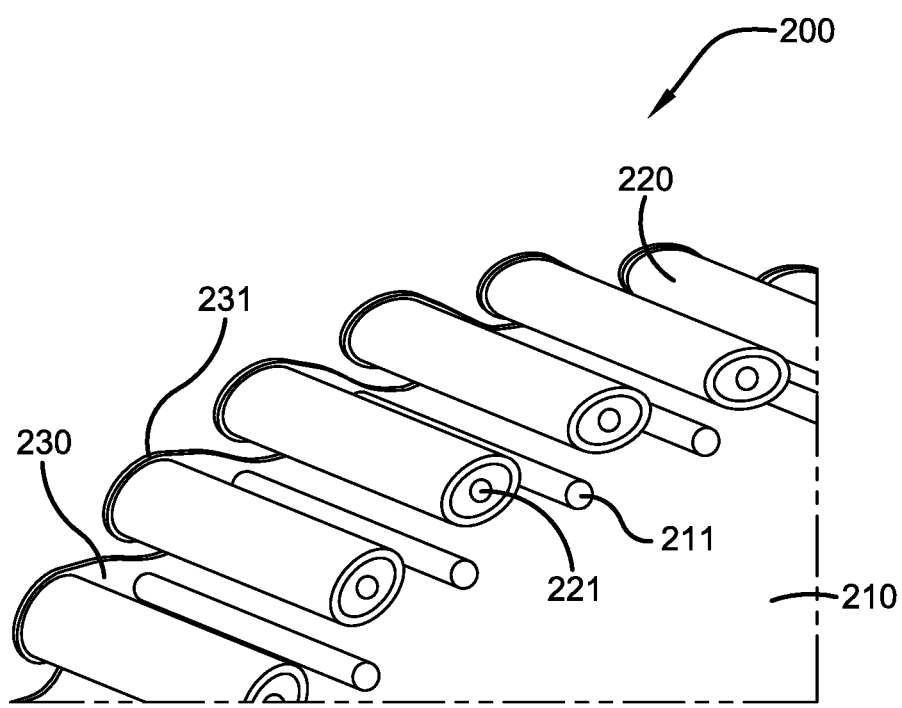
FIG. 4 is a schematic detailed perspective view of part of the wheel assembly of FIG. 1.

FIGS. 1-4 show a wheel assembly 200 in accordance with the present invention for use with pneumatic and/or non-pneumatic tire assemblies, such as the assembly 140. The wheel assembly 200 may include a mounting plate 210 for attachment to a rotatable axle or similar structure (not shown), a plurality of elongate, oval cross-sectional friction members 220 attached to the mounting plate 210, a plurality of angular projecting flanges 230 having an oval stop plate 231 at each distal end, and an annular flange 240 that may attach to the mounting plate 210 on an axial side opposite the projecting flanges 230. As shown in FIG. 3, the annular flange 240 may have a plurality of angular projecting flanges 241 having an oval stop plate 243 at each distal end, similar to the flanges 230, but projecting in a circumferentially opposite direction than the flanges 230. Each oval stop plate 243 of the annual flange 240 may have axially extending holes 245 for securing the annular flange 240 to corresponding axially extending holes 221 in each friction member 220 at an axially opposite end from the projecting flanges 230, once a tire assembly, such as the example tire assembly 140 (FIG. 5), has been brought into engagement with the friction members 220. Fasteners 247, such as bolts, may be used to attach the annular flange 240 to the friction members 220.

For example, the tire assembly 140 may be brought into engagement with each of the friction members 220 such that parts of the spoke structure 110 of the tire assembly are positioned between a radially inner oval surface 223 of each friction member 220 and two of a plurality of axially extending cylindrical rods 211 disposed radially inward from the friction members 220 on the mounting plate 210. Each of the rods 211 may be located at a circumferential mid-point between, and radially inside each of the friction members 220 (FIGS. 1 & 2). This arrangement of friction members 220 and the rods 211 may thus create a stable, secure, and shock-resistant connection between the tire assembly 140 and the wheel assembly 200 with an enhanced and uniform stress distribution within the spoke structure 110 of the tire assembly 140.

Variations in the present invention are possible in light of the description of it provided herein. While certain representative examples and details have been shown for the purpose of illustrating the subject invention, it will be apparent to those skilled in this art that various changes and modifications can be made therein without departing from the scope of the subject invention. It is, therefore, to be understood that changes can be made in the particular examples described which will be within the full scope of the present invention as defined by the following appended claims. Further, the present invention is not limited to the examples hereinbefore described which may be varied in both construction and detail within the full scope of the appended claims.

What is claimed:

1. A wheel assembly comprising:
   a mounting plate for attachment to a rotatable axle;
   a plurality of elongate friction members for engaging a tire assembly;
   a plurality of first angular flanges extending radially outward and circumferentially in a first direction from the mounting plate; and a plurality of second angular flanges extending radially outward and circumferentially in a second direction, opposite of the first direction, from the mounting plate,
each elongate friction member being disposed axially between one of the first angular flanges and one of the second angular flanges.

2. The wheel assembly as set forth in claim 1 wherein each friction member has an oval cross-sectional configuration in an axial direction.

3. The wheel assembly as set forth in claim 1 wherein the first flanges extend at a first angle from the mounting plate, the second flanges extend at a second angle from the mounting plate, and the second angle is equal and opposite to the first angle.

4. The wheel assembly as set forth in claim 1 wherein each of the first angular flanges has a first stop plate for limiting axial movement between the wheel assembly and the tire assembly.

5. The wheel assembly as set forth in claim 4 wherein each friction member is secured to the mounting plate by the first stop plate.

6. The wheel assembly as set forth in claim 5 wherein each of the second angular flanges has a second stop plate for limiting axial movement between the wheel assembly and the tire assembly.

7. The wheel assembly as set forth in claim 6 wherein each friction member is secured to the mounting plate by the second stop plate.

8. The wheel assembly as set forth in claim 7 wherein the first stop plate is disposed at a first axial end of one of the friction members and the second stop plate is disposed at a second, opposite axial end of the one friction member.

9. The wheel assembly as set forth in claim 1 wherein the second angular flanges are secured to the friction members by bolts.

10. A method for securing a wheel assembly to a tire assembly comprising the steps of:
attaching a mounting plate to a rotatable axle;
extending a plurality of elongate friction members axially from the mounting plate;
engaging the tire assembly with the plurality of elongate friction members;
extending a plurality of first angular flanges radially outward and circumferentially in a first direction from the mounting plate;
extending a plurality of second angular flanges radially outward and circumferentially in a second direction, opposite the first direction, from the mounting plate; and
positioning each elongate friction member axially between one of the first angular flanges and one of the second angular flanges.

11. The method as set forth in claim 10 wherein each friction member has an oval cross-sectional configuration in an axial direction.

12. The method as set forth in claim 10 further including the steps of:
extending the first flanges at a first angle from the mounting plate; and
extending the second flanges at a second angle from the mounting plate, the first angle being equal and opposite the second angle.

13. The method as set forth in claim 10 further including the step of limiting axial movement between the wheel assembly and the tire assembly with first stop plates extending from the first angular flanges.

14. The method as set forth in claim 13 further including the step of securing each friction member to the mounting plate by the first stop plate.

15. The method as set forth in claim 14 further including the step of limiting axial movement between the wheel assembly and the tire assembly with second stop plates extending from the second angular flanges.

16. The method as set forth in claim 15 further including the step of securing each friction member to the mounting plate by the second stop plate.

17. The method as set forth in claim 16 further including the steps of:
positioning the first stop plate at a first axial end of one of the friction members; and
positioning the second stop plate at a second, opposite axial end of the one friction member.

18. The method as set forth in claim 10 further including the step of securing the second angular flanges to the friction members with bolts.

\* \* \* \* \*